(12) United States Patent
Wang et al.

(10) Patent No.: US 10,248,270 B2
(45) Date of Patent: Apr. 2, 2019

(54) INFLECTION BASED BENDING SIGNAL ABSTRACTION FROM A MIXED SIGNAL

(71) Applicant: Synaptics Incorporated, San Jose, CA (US)

(72) Inventors: Ying Wang, Fremont, CA (US); Qingbiao Deng, San Jose, CA (US); Igor Polishchuk, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 252 days.

(21) Appl. No.: 15/282,887

(22) Filed: Sep. 30, 2016

(65) Prior Publication Data

US 2018/0095557 A1    Apr. 5, 2018

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01)

(58) Field of Classification Search
CPC ...... G06F 3/044; G06F 3/0412; G06F 3/0418; G06F 3/0416; G06F 2203/04106; G06F 3/0414
See application file for complete search history.

(56) References Cited

U.S. PATENT DOCUMENTS

| 2013/0093715 | A1* | 4/2013 | Marsden | G06F 3/044 345/174 |
| 2015/0160757 | A1* | 6/2015 | Yeh | G06F 3/044 345/174 |
| 2015/0301667 | A1* | 10/2015 | Yano | G06F 3/0412 345/173 |
| 2016/0179264 | A1* | 6/2016 | Harley | G06F 3/0418 345/174 |

* cited by examiner

*Primary Examiner* — Jennifer Mehmood
*Assistant Examiner* — James S Nokham
(74) *Attorney, Agent, or Firm* — Ferguson Braswell Fraser Kubasta PC

(57) ABSTRACT

A method for performing capacitive force sensing involves acquiring a plurality of changes of capacitance at a plurality of sensor electrodes, determining an input object location, obtaining a mixed signal representing the plurality of changes of capacitance at the input object location, wherein the mixed signal comprises a touch signal portion and a bending signal portion, identifying at least one inflection point using the mixed signal, using the at least one inflection point, identifying a touch signal region of the mixed signal, performing curve fitting to complete the bending signal portion in the touch signal region of the mixed signal to obtain a completed bending signal, and determining an applied force based on the completed bending signal.

17 Claims, 7 Drawing Sheets

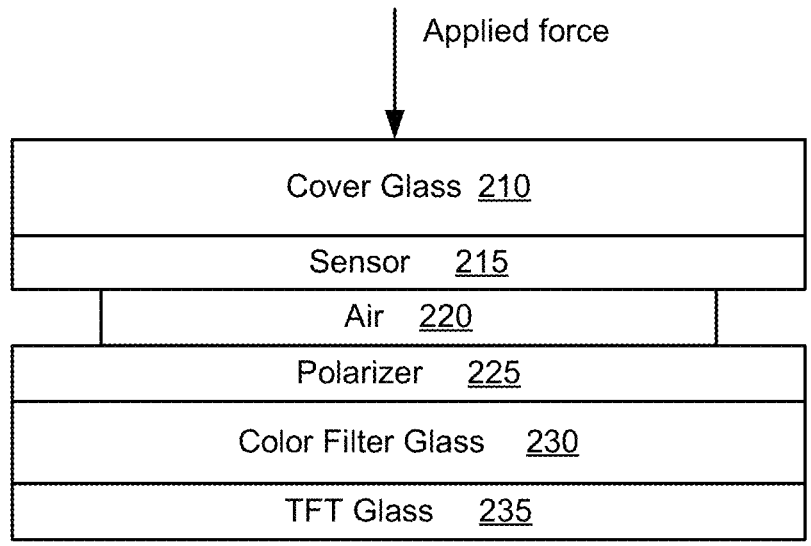
FIG. 2.1
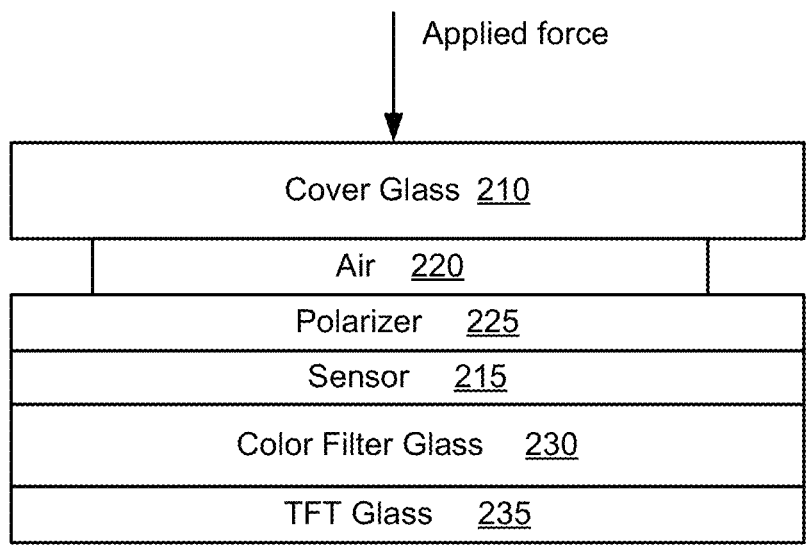
FIG. 2.2

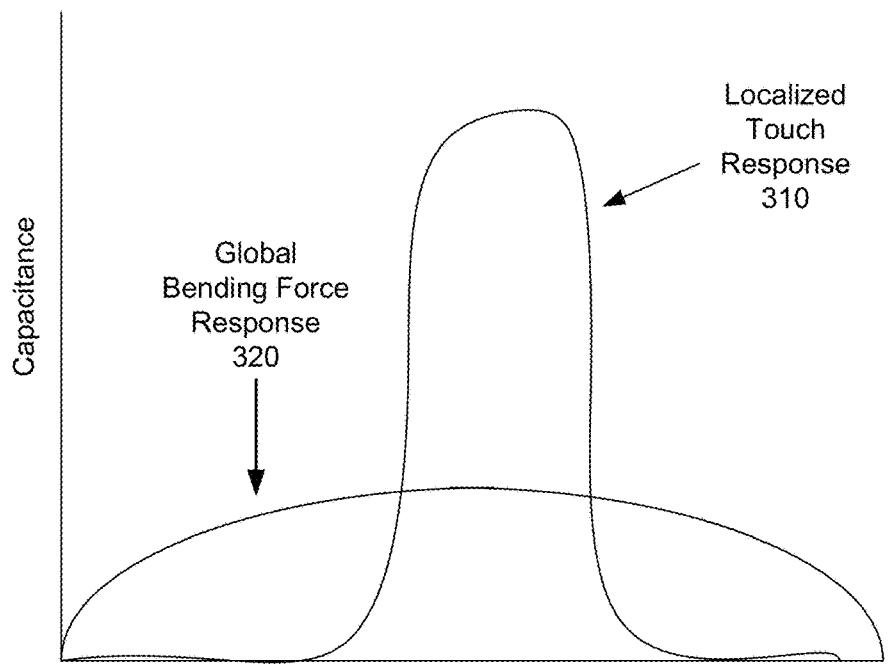
*FIG. 3.1*
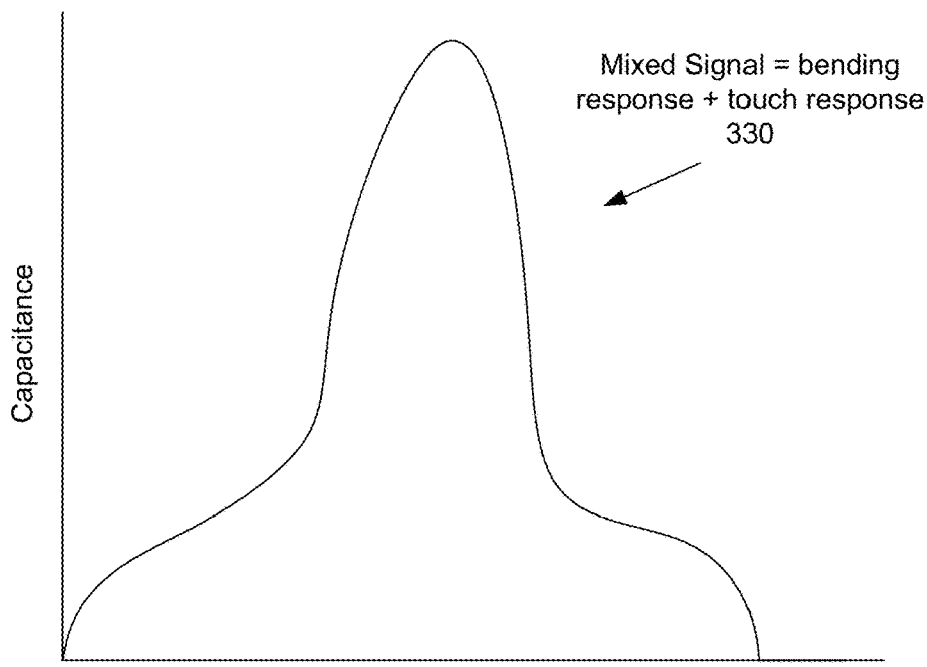
*FIG. 3.2*

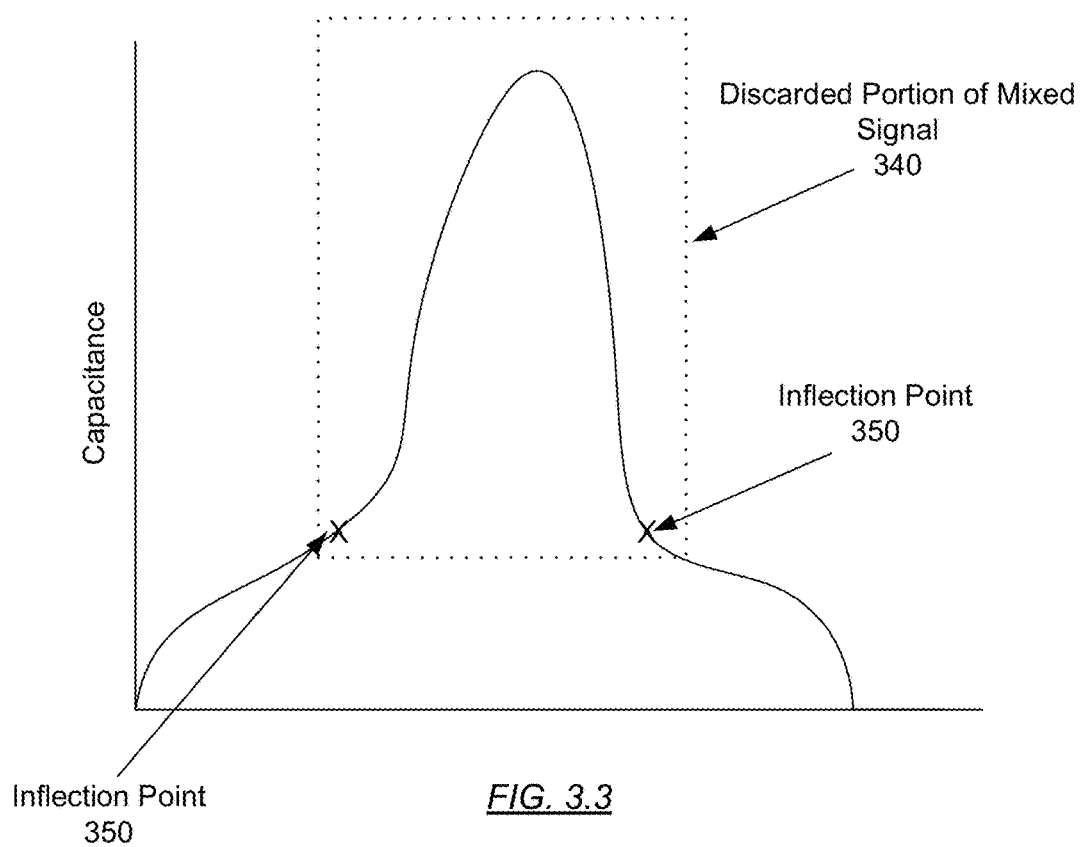
FIG. 3.3
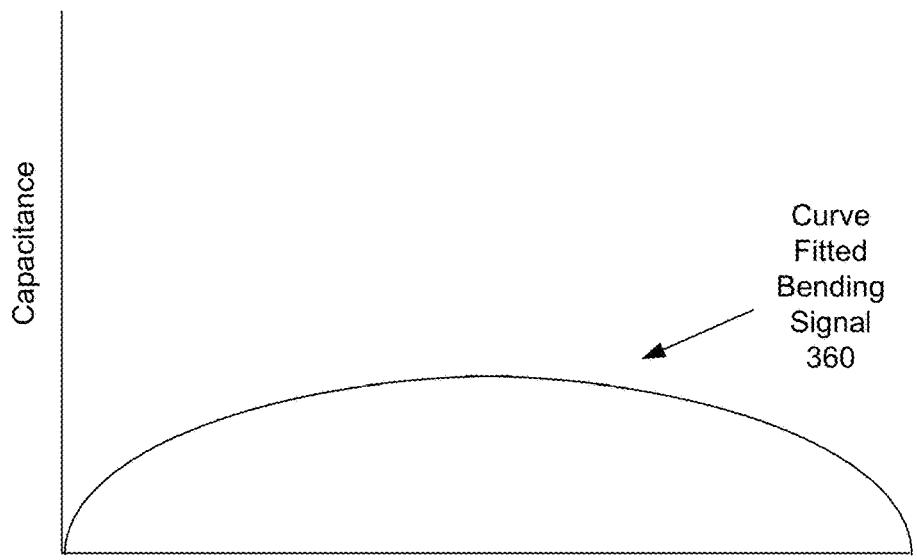
FIG. 3.4

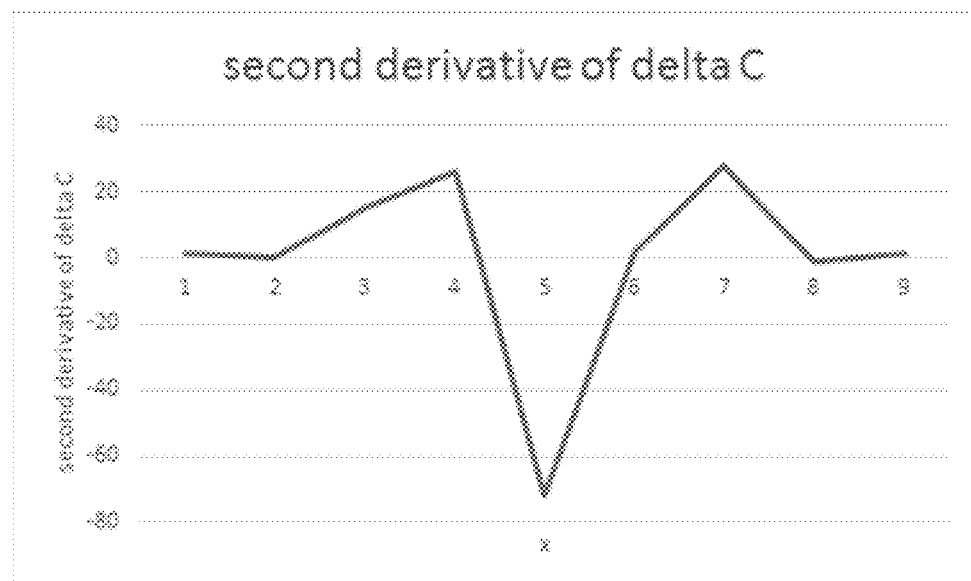
FIG. 5.1
| Delta C | -1 | -1 | 0 | 1 | 17 | 59 | 29 | 1 | 1 | 0 | 0 |
|---|---|---|---|---|---|---|---|---|---|---|---|
| 2nd Derivative | | 1 | 0 | 15 | 26 | -72 | 2 | 28 | -1 | 1 | |
FIG. 5.2

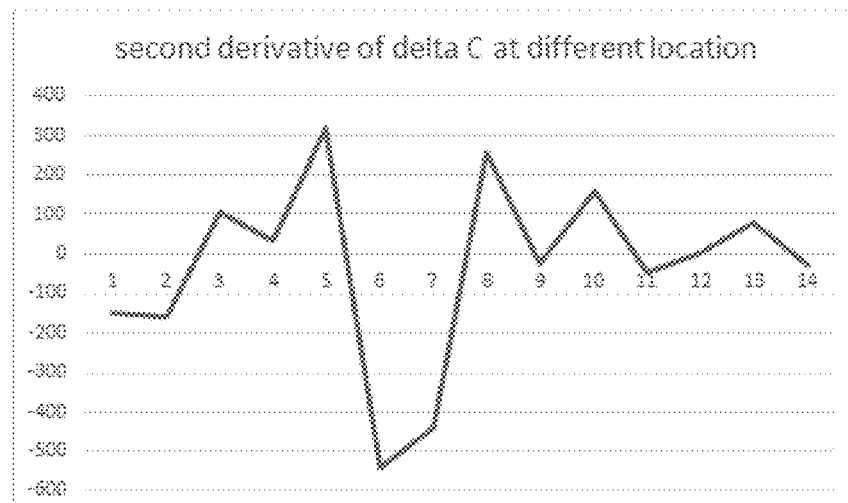
FIG. 6.1
| Delta C | 3124 | 3298 | 3314 | 3434 | 3586 | 4057 | 3986 | 3474 | 3217 | 2934 | 2808 | 2635 | 2464 |
|---|---|---|---|---|---|---|---|---|---|---|---|---|---|
| 2nd Derivative | -148 | -158 | 104 | 32 | 319 | -542 | -441 | 255 | -26 | 157 | -47 | 2 | 77 |
FIG. 6.2

US 10,248,270 B2

INFLECTION BASED BENDING SIGNAL ABSTRACTION FROM A MIXED SIGNAL

BACKGROUND OF INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a method for performing capacitive force sensing, comprising acquiring a plurality of changes of capacitance at a plurality of sensor electrodes, determining an input object location, obtaining a mixed signal representing the plurality of changes of capacitance at the input object location, wherein the mixed signal comprises a touch signal portion and a bending signal portion, identifying at least one inflection point using the mixed signal, using the at least one inflection point, identifying a touch signal region of the mixed signal, performing curve fitting to complete the bending signal portion in the touch signal region of the mixed signal to obtain a completed bending signal, and determining an applied force based on the completed bending signal.

In general, in one aspect, the invention relates to a processing system for an input device, the processing system comprising sensor circuitry communicatively coupled to a plurality of position sensor electrodes and a plurality of force sensor electrodes, a sensor module comprising circuitry configured to acquire a plurality of changes of capacitance at a plurality of sensor electrodes, a determination module configured to determine an input object location, obtain a mixed signal from the plurality of changes of capacitance at the input object location, wherein the mixed signal comprises a touch signal portion and a bending signal portion, identify at least one inflection point using the mixed signal, using the at least one inflection point, identify the touch signal portion of the mixed signal, perform curve fitting to complete the bending signal portion in the touch signal portion of the mixed signal to obtain a completed bending signal, and determine an applied force based on the completed bending signal.

In general, in one aspect, the invention relates to an input device, comprising an input surface, a plurality of force sensor electrodes, and a processing system comprising circuitry configured to: acquire a plurality of changes of capacitance at a plurality of sensor electrodes, determine an input object location, obtain a mixed signal from the plurality of changes of capacitance at the input object location, wherein the mixed signal comprises a touch signal portion and a bending signal portion, identify at least one inflection point using the mixed signal, using the at least one inflection point, identify the touch signal portion of the mixed signal, perform curve fitting to complete the bending signal portion in the touch signal portion of the mixed signal to obtain a completed bending signal, and determine an applied force based on the completed bending signal.

BRIEF DESCRIPTION OF DRAWINGS

FIGS. 2.1 and 2.2 show example stack ups in accordance with one or more embodiments.

FIGS. 3.1-3.2 show examples of a mixed signal in accordance with one or more embodiments of the invention.

FIG. 3.3 shows an example of inflection points in accordance with one or more embodiments of the invention.

FIG. 3.4 shows an example of a completed bending signal in accordance with one or more embodiments of the invention.

FIGS. 5.1 and 5.2 show an example in accordance with one or more embodiments.

FIGS. 6.1 and 6.2 show an example in accordance with one or more embodiments.

DETAILED DESCRIPTION

Figure 1:
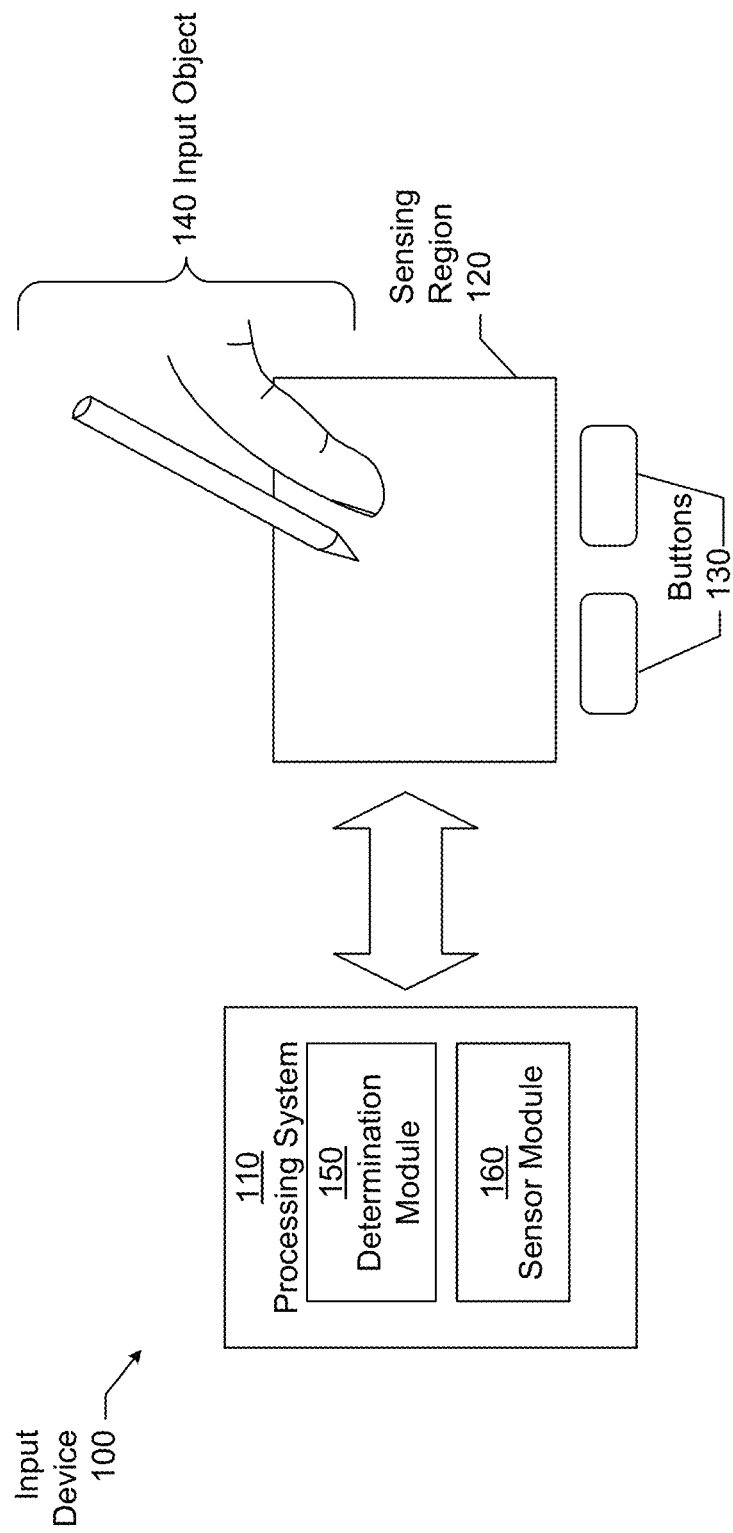
FIG. 1 shows a block diagram in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method for inflection based bending signal abstraction to obtain a force applied on the surface of an input device from a mixed signal that represents both a touch and a force response. Specifically, embodiments of the invention obtain a mixed signal from the change in capacitance of an input device stack up when pressure is applied on the top surface of the input device. The mixed signal is then used to calculate an applied force by identifying the localized touch response signal, discarding this portion of the mixed signal, and applying a curve fitting algorithm to complete the bending force response in the touch response region.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitance implementations of the input device (100), voltage or current is applied to create an electric field. Nearby input objects cause changes in the electric field, and produce detectable changes in capacitive coupling that may be detected as changes in voltage, current, or the like.

Some capacitance implementations utilize arrays or other regular or irregular patterns of capacitive sensing elements to create electric fields. In some capacitance implementations, separate sensing elements may be ohmically shorted together to form larger sensor electrodes. Some capacitance implementations utilize resistive sheets, which may be uniformly resistive.

Some capacitance implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitance implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (also called "sensing signal"). Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a processor (150) and sensor circuitry (160). The processor (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor circuitry (160) may include functionality to drive the sensing elements to transmit transmitter signals and receive the resulting signals. For example, the sensor circuitry (160) may include circuitry that is coupled to the sensing elements. The sensor circuitry (160) may include, for example, a transmitter and a receiver. The transmitter may include transmitter circuitry that is coupled to a transmitting portion of the sensing elements. The receiver may include receiver circuitry coupled to a receiving portion of the sensing elements and may include functionality to receive the resulting signals.

Although FIG. 1 shows a processor (150) and sensor circuitry (160), alternative or additional elements/modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, determine force information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" (3D) positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

FIG. 2.1 shows an example stack up for an input device in accordance with one or more embodiments of the invention. More specifically, FIG. 2.1 shows an example stack-up having multiple layers including a cover glass (210) layer on the top, a sensor layer (215) directly below the cover glass, an air gap (220) below the sensor layer (215), a polarizer (225) below the air gap (220), and two glass layers (color filter glass (230), TFT glass (235)) at the bottom of the stack up. The cover glass (210) is a protective cover on the display (not shown). The cover glass (210) and display may together form a top layer of the input device. The sensor layer (215) may be made of plastic or another suitable layer, and may include a plurality of sensing electrodes for sensing touch and/or force applied on the cover glass of the input device. In FIG. 2.1, the air gap is between the sensor layer (215) and the ground plane. The air gap (220) provides a compressible layer so that when pressure is applied on the cover glass (210), the stack up compresses the distance between various layers. This change in distance may be used to calculate the change in capacitance of the sensing electrodes.

The polarizer (225) is a device that filters an unpolarized or mixed-polarization beam of electromagnetic waves (e.g., light) to only pass waves with a single polarization state (e.g., a single linear polarization). In one or more embodiments, the polarizer (225) may be an absorptive polarizer, where the unwanted polarization states are absorbed by the device, or a beam-splitting polarizer, where the unpolarized beam is split into two beams with opposite polarization states, one of which is reflected and one of which is transmitted through the polarizer (225). Absorptive polarizers may be made of polyvinyl alcohol (PVA) plastic with an iodine doping. Beam-splitting polarizers may be thin-film polarizers, which are created by layering an optical coating on a substrate material such as glass. The polarizer (225) may be used in the input device of the present invention to control how light interacts with or is emitted by the display.

The color filter glass (230) and thin-film-transistor (TFT) glass (235) may include sensing electrodes for force sensing. For example, the stack up may have both the receive (Rx) and transmit (Tx) on the TFT glass (235) (co-planar) or may have the Tx on the TFT glass (235) and the Rx on the color filter glass (230). The latter gives a better touch performance and higher signal-to-noise ratio (SNR).

Force is applied on the surface of the cover glass, causing compression within the stack up. Thus, when the screen of the input device is pressed, the sensor moves toward to ground plane and the capacitance Ct is decreased, which cause an increase in the change in capacitance (delta capacitance). In other words, the capacitance is reduced when the ground plane is closer to the sensor.

Those skilled in the art will appreciate that the touch/force sensing stack up shown in FIG. 2.1 may have different configurations without departing from the scope of the invention. For example, FIG. 2.2 shows an alternate configuration of the stack up in which the air gap (220) is directly below the cover glass (210), and above the sensor layer (215). Because in FIG. 2.2 the air gap (220) is positioned above the sensor layer (215), when the input device screen is pressed, the cover glass (210) moves toward the sensor layer (215). ε of air (εr=1) is replaced by glass (εr=8), therefore capacitance increases, which causes the delta (change) in capacitance to decrease.

Those skilled in the art will appreciate that embodiments of the invention apply to any input device stack ups having an air gap, because no change to the hardware is required in stack ups with an air gap in order to abstract the bending signal from the mixed signal that includes both touch and force.

FIG. 3.1 shows two signals plotted superimposed on each other in accordance with one or more embodiments of the invention. Specifically, FIG. 3.1 shows a localized touch response (310) signal and a global bending force response (320) signal. The localized touch response signal (310) represents the change in capacitance (shown on the y-axis) when a touch response is applied on the surface of an input device. Similarly, the global bending force response (320) represents the change in capacitance when force is applied on the surface of the input device. In one or more embodiments, the force signal is called a global bending signal (320) because when pressure is applied on the surface of the input device, the bending occurs everywhere, across the entire surface of the input device. That is, the capacitance changes across the entire sensing electrode layer(s), and not only in and around the area of the position of the input object. Thus, the displacement is global. This occurs because the cover glass is hard and bending in one area of the cover glass may cause bending, usually to a lesser degree, in other areas of the cover glass. By contrast, the localized touch response (310) is more local in that the touch input only changes the capacitance at or near the touch position of the input object, and does not register across the entire surface of the input device.

In one or more embodiments of the invention, the slope of the global bending signal (320) is small, because the change in capacitance is not as sharp. In contrast, the slope of the touch signal (310) is large, because of the sharp upward curve (as can be seen in FIG. 3.1) of the localized touch response (310) near the touch position. In one or more embodiments, this difference in the slope of the two signals is used to isolate and discard the localized touch response (310), as is described in more detail below.

FIG. 3.2 shows the mixed signal (330) that is obtained by combining the two signals of FIG. 3.1. Accordingly, the mixed signal (330) of FIG. 3.2 represents a combination of the global bending force response and the localized touch response. When pressure is applied on the top of the stack up (see e.g., FIG. 2.1-2.2), the plurality of changes in capacitance is measured, resulting in the graphical representation of the combined force and touch responses in the form of the mixed signal (330) depicted in FIG. 3.2.

As described above, the slope (first derivative) of the mixed signal is small in the areas of the global bending signal, and large in the localized touch region. Thus, by taking the second derivative (i.e., change in slope) of the mixed signal (see e.g., 330, FIG. 3.2), the area of the global bending signal may be separated from the touch region. FIG. 3.3 shows the mixed signal (230) with plotted inflection points (350) in accordance with one or more embodiments of the invention. Specifically, inflection points (350) are located at the part of the mixed signal on the borders of the localized touch response. In other words, the inflection points (350) border or represent the boundaries of the localized touch response.

In one or more embodiments of the invention, the inflection points (350) are identified when the second derivative of the mixed signal is calculated. The inflection points (350) are used to separate the localized touch region from the bending signal area in the mixed signal. Specifically, on a graphical representation, the inflection points (350) are identifiable because taking the second derivative (or performing another suitable calculation) results in the observation of the peak values bordering the localized touch region. The position between the finger position and inflection position is localized touch region and all other positions are the bending area.

In one or more embodiments of the invention, the portion of the mixed signal between the identified inflection points, i.e., the localized touch response, is discarded or removed in order to isolate the bending area signal. FIG. 3.3 shows the discarded portion of the mixed signal (340) as including a portion of the mixed signal slightly outside of the inflection points in addition to the portion of the mixed signal between the inflection points. This ensures that the entirety of the localized touch response signal is discarded.

Those skilled in the art will appreciate that taking the second derivative of the mixed signal is one way to obtain the inflection points of the mixed signal, which works well for a one-dimensional representation of the mixed signal. However, there may be other algorithms used to obtain the inflection points without departing from the scope of the invention. For example, logarithmic algorithms, floating algorithms, machine learning, gradient algorithms, or any other suitable algorithm, may be employed to determine the second derivative of the mixed signal. Such alternate methods may be employed particularly when the mixed signal is represented in two-dimensions, to obtain the inflection points of the mixed signal.

FIG. 3.4 shows a completed bending signal (360) in accordance with one or more embodiments of the invention. Specifically, in one or more embodiments of the invention, after discarding the portion of the mixed signal in the localized touch region (see e.g., 340 in FIG. 3.3), the global bending signal is completed (360) in the discarded region. In one or more embodiments, the global bending signal is completed using a curve fitting algorithm to replace the discarded portion of the mixed signal. That is, the points along the bending signal curve are determined using a best fit approach to complete the global bending signal in the localized touch region. Those of ordinary skill in the art will appreciate that curve fitting may involve either interpolation, where an exact fit to the data is required, or smoothing, in which a "smooth" function is constructed that approximately fits the data. As described above, the bending that occurs when force is applied to the cover glass is a global bending that results in a plurality of changes in capacitance across the plurality of sensor electrodes in the sensor layer, TFT glass layer, and/or color filter glass layer of the stack up. It is because of this that the global bending signal is able to be completed (360) using curve fitting in the area where the localized touch response is most prominent in the mixed signal. As is readily observable from FIG. 3.4, the curve-fitted global bending signal (360) is similar to the separate global bending signal shown in FIG. 3.1. Using the process shown in FIGS. 3.2-3.4, the global bending response signal is abstracted and isolated from the localized touch response.

Figure 4:
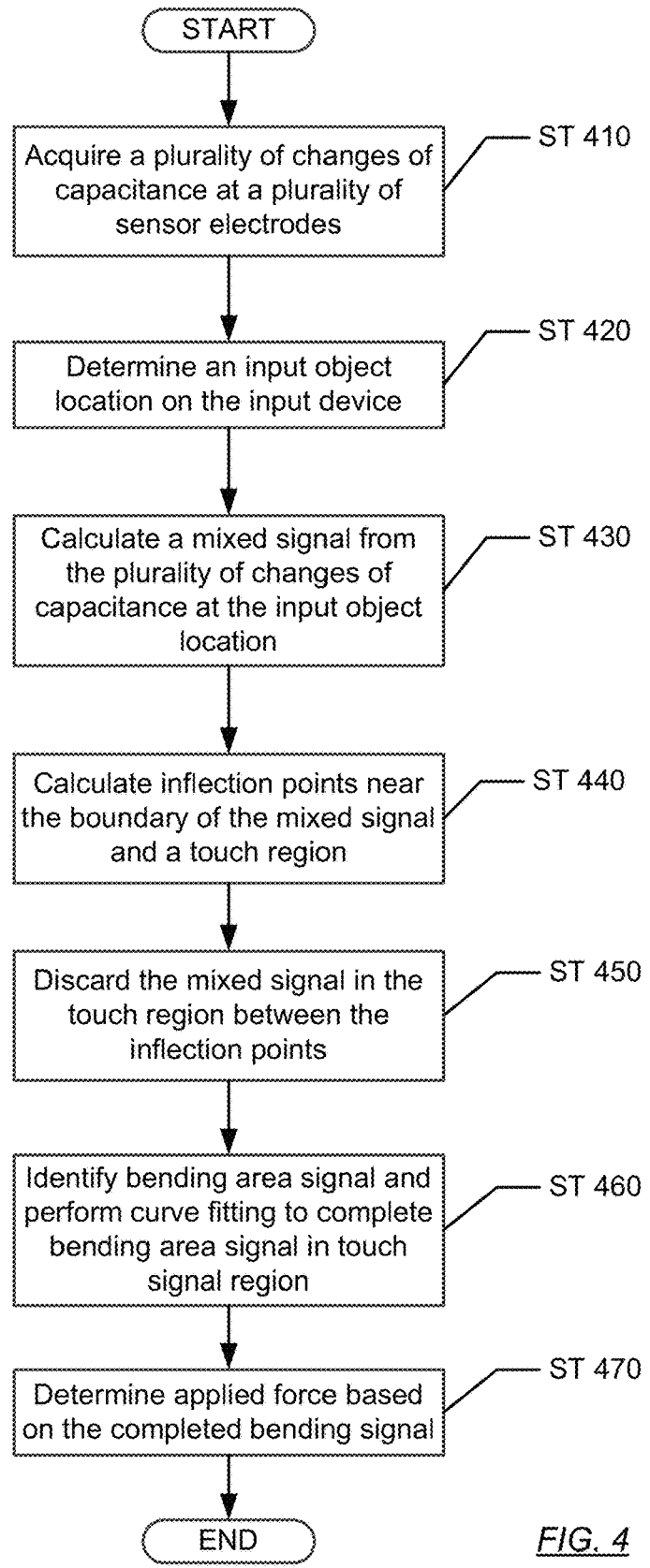
FIG. 4 shows a flowchart in accordance with one or more embodiments.

FIG. 4 shows a flow chart for method of abstracting the bending area signal from a mixed signal in accordance with one or more embodiments of the invention. While the various steps in the flowchart are presented and described sequentially, one of ordinary skill in the art will appreciate that some or all of the steps may be executed in different orders, may be combined or omitted, and/or may be executed in parallel without departing from the scope of the invention.

Initially, in Step 410, a plurality of changes in capacitance is acquired at the plurality of sensor electrodes. Specifically, each of the plurality of sensor electrodes measure a change in capacitance when a touch and/or force is applied on the surface of the input device. These measurements are read and acquired across all the sensor electrodes. Such measurements may be acquired simultaneously for all of the sensor electrodes, or in a staggered manner, across various groups of sensor electrodes at a time, depending on the hardware (multiplexers, analog to digital converters, etc.) available. As described above, the sensor electrodes may be located on one or more of the layers in the input device stack up shown for examples in FIGS. 2.1 and 2.2. For example, sensor electrodes may be located in the sensor layer, in the TFT glass layer, and/or in the color filter glass layer.

Next, based on the plurality of changes in capacitance, a position of an input object on the surface of the input device is determined (Step 420). The input object may be, for example, a user's finger, a stylus, digital marker, or any other suitable input object capable of applying a touch input and/or an applied force on the surface of the input device. The position of the input object may be determined by the thermal response of the sensor electrodes, or directly by the changes in capacitance.

In Step 430, a mixed signal is calculated/observed by plotting the plurality of changes in capacitance with respect to the position of the input object on a graph. As described above and shown in FIG. 3.2, the mixed signal is a combination of the localized touch response centered about the input object position on the input device, and the global bending response as a result of the force applied by the input device. Further, because the bending response is global, changes in capacitance are observed everywhere on the surface of the input device. For the localized touch response, the plurality of changes in capacitance is only observed at the input object location. Those skilled in the art will appreciate that in graphing the mixed signal, the localized touch response and the global bending response are not separately observable or able to be isolated. The mixed signal includes a combination of both responses.

In Step 440, the inflection points of the mixed signal are calculated. For example, inflection points may be calculated by taking the second derivative of the mixed signal to obtain the change in slope at various points of the mixed signal curve. In one or more embodiments, the inflection points are observed near the boundary of the mixed signal and the localized touch region. In other words, the inflection points border the localized touch response signal in the touch region.

In Step 450, the mixed signal portion between the inflection points, in the touch region, is discarded. This leaves an incomplete mixed signal, which is subsequently completed using a curve fitting algorithm in Step 460. Specifically, the bending area signal is completed by applying curve fitting to determine the missing data points in the localized touch region. At this stage, the bending area signal is isolated and the applied force is identified based on the completed global bending signal (Step 470). That is, the force applied by the input object is determined using the completed global bending signal using well-known methods for identifying the applied force based on the change in capacitance across the surface of the input device. For example, the applied force may be extrapolated using one or more of a thin plate bending model, sponge compression effect, and components inside the phone. As another example, the applied force may be calculated by applying the following algorithm. The force on electrode (channel) n may be represented by the mathematical relationship: f(delta_ADC, touch_x, touch_y, electrode_x, electrode_y). The total force is the sum of the force on each channel. Upon determining this, positional compensation may be applied, with the goal being to make a uniform force report at different press locations.

In one or more embodiments of the invention, although not shown in FIG. 4, the applied force obtained in Step 470 of FIG. 4 may be reported to a host device, so that the host device can use the applied force value to perform some action. For example, in a gaming scenario, the applied force may be used by a host device to accelerate an object of a game executing on the input device. The applied force value may also be reported for display on the host device, or on the input device itself.

FIGS. 5.1-5.2 show an example of identifying the inflection points on a localized touch response signal in accordance with one or more embodiments of the invention. In other words, the signal of the example shown in FIG. 5.1 is not a mixed signal, but rather, represents only a touch response.

Specifically, in FIG. 5.1, the graph shows the second derivative of the changes in capacitance when a finger touches the input surface of an input device. As can be observed in the graph, the finger touch position is at position=5, marked by an "x" on the graph. FIG. 5.2 shows the delta C, or change in capacitance, on the first row. The second row of the table in FIG. 5.2 shows the second derivative values corresponding to the delta C. At the touch position x=5, the second derivative value is −72.

Looking at FIG. 5.1, when the finger touches the screen of the input device around touch position x=5, the second derivative of delta C has two peaks, one at position x=4, and another at x=7. The second derivative values corresponding to these peaks is 26 and 28, respectively. The position of the peak values is the border of the touch region. These peak values may be used to identify the inflection points for a mixed signal graph.

FIGS. 6.1 and 6.2 shows another example of identifying the inflection points for a mixed signal in accordance with one or more embodiments of the invention. Specifically, FIG. 6.1 shows a finger press (touch+force) on the input device surface when the air gap in the capacitive stack up of the input device is positioned between the sensor and the ground plane, similar to that which is shown in FIG. 2.1 above.

In FIG. 6.1, the touch position of the finger is x=6. The two peaks are at x=5 and x=8, where the values of the second derivative are 319 and 255, respectively, in FIG. 6.2. From the peak position at x=5 to the touch position x=6, and from the touch position x=6 to the peak position x=8, the signal includes both touch and force (i.e., is a mixed signal). Outside the peak positions, the signal only includes the global bending information. Accordingly, using FIGS. 6.1 and 6.2, inflection points marking the border of touch and force are identified at x=5 and x=8, and the region between these peak positions is discarded in order to remove the mixed signal portion in the touch region.

Upon discarding of the mixed signal in the touch region, any curve fitting algorithm, such as linear least squares, or best fit algorithms are used to complete the global bending response in the touch region, using the signal values outside of the peak inflection point values. Once the global bending signal is complete, the force response can be obtained at the input object position using known methods.

Embodiments of the invention provide a force detection mechanism for devices having a capacitive stack up with an air gap. That is, without any change in hardware, for designs with an air gap, a force detector may be supported by abstracting the global bending signal from the mixed signal that includes both a touch response and a force response. For this purpose, inflection based in bending signal abstraction from a mixed signal is used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing capacitive force sensing, comprising:
   obtaining a mixed signal representing a plurality of capacitance changes associated with a plurality of sensor electrodes and a surface, wherein the plurality of sensor electrodes is associated with a plurality of positions along the surface, and wherein the mixed signal comprises a touch response signal and a bending response signal;
   identifying at least one inflection point within the mixed signal;
   identifying, based on the at least one inflection point, a touch signal region and a plurality of bending signal areas of the mixed signal;
   generating, from the mixed signal, an estimate of the bending response signal by:
      discarding a portion of the mixed signal corresponding to the touch signal region; and
      joining the plurality of bending signal areas by performing curve fitting; and
   determining a force applied to the surface based on the estimate of the bending response signal.

2. The method of claim 1, wherein at least two inflection points are identified based on the mixed signal, and wherein the at least two inflection points border the touch signal region.

3. The method of claim 1, wherein identifying the at least one inflection point comprises calculating the second derivative of the mixed signal.

4. The method of claim 1, wherein the surface is in a sensing region of the plurality of sensor electrodes.

5. The method of claim 1, wherein the force is applied by a user's finger.

6. The method of claim 1, further comprising:
   reporting the force to a host device.

7. The method of claim 1, wherein the plurality of sensor electrodes is used for both touch input and force input.

8. A processing system for an input device comprising a surface, the processing system comprising:
   a sensor module comprising circuitry configured to:
      acquire a plurality of capacitance changes associated with a plurality of sensor electrodes and the surface, wherein the plurality of sensor electrodes is associated with a plurality of positions along the surface; and
   a determination module configured to:
      obtain a mixed signal representing the plurality of capacitance changes at the plurality of positions, wherein the mixed signal comprises a touch response signal and a bending response signal;
      identify at least one inflection point within the mixed signal;
      identify, based on the at least one inflection point, a touch signal region and a plurality of bending signal areas of the mixed signal;
      generate, from the mixed signal, an estimate of the bending response signal by:
         discarding a portion of the mixed signal corresponding to the touch signal region; and
         joining the plurality of bending signal areas by performing curve fitting; and
      determine a force applied to the surface based on the estimate of the bending response signal.

9. The processing system of claim 8, wherein at least two inflection points are identified based on the mixed signal, and wherein the at least two inflection points border the touch signal region.

10. The processing system of claim 8, wherein identifying the at least one inflection point comprises calculating the second derivative of the mixed signal.

11. The processing system of claim 8, wherein the surface is in a sensing region of the plurality of sensor electrodes.

12. An input device, comprising:
   a surface;
   a plurality of sensor electrodes associated with a plurality of positions along the surface; and
   a processing system comprising circuitry configured to:
      obtain a mixed signal representing a plurality of capacitance changes associated with the plurality of sensor electrodes and the surface, wherein the mixed signal comprises a touch response signal and a bending response signal;
      identify at least one inflection point within the mixed signal;
      identify, based on the at least one inflection point, a touch signal region and a plurality of bending signal areas of the mixed signal;
      generate, from the mixed signal, an estimate of the bending response signal by:
         discarding a portion of the mixed signal corresponding to the touch signal region; and
         joining the plurality of bending signal areas by performing curve fitting; and
      determine a force applied to the surface based on the estimate of the bending response signal.

13. The input device of claim 12, further comprising:
   a cover glass;
   a polarizer; and
   an air gap between the cover glass and the polarizer.

14. The input device of claim 12, wherein at least two inflection points are identified based on the mixed signal, and wherein the at least two inflection points border the touch signal region.

15. The input device of claim 12, wherein the touch signal region separates the plurality of bending signal areas.

16. The input device of claim 12, wherein the force is applied by a user's finger.

17. The input device of claim 12, wherein identifying the at least one inflection point comprises calculating the second derivative of the mixed signal.

* * * * *